(12) United States Patent
Gordeev et al.

(10) Patent No.: US 6,179,886 B1
(45) Date of Patent: Jan. 30, 2001

(54) METHOD FOR PRODUCING ABRASIVE GRAINS AND THE COMPOSITE ABRASIVE GRAINS PRODUCED BY SAME

(75) Inventors: Sergey Konstantinovitch Gordeev; Sergey Germanovitch Zhukov; Lija Vladimirovna Danchukova, all of St. Petersburg (RU); Thommy Ekström, Stockholm (SE)

(73) Assignee: Ambler Technologies, Inc., Santa Clara, CA (US)

( * ) Notice: Under 35 U.S.C. 154(b), the term of this patent shall be extended for 0 days.

(21) Appl. No.: 09/262,609

(22) Filed: Mar. 4, 1999

(51) Int. Cl.[7] .................. C09K 3/14; B24D 3/04; B24D 3/06
(52) U.S. Cl. .............. 51/293; 51/307; 51/295; 51/309
(58) Field of Search ............... 51/295, 293, 307, 51/309

(56) References Cited

U.S. PATENT DOCUMENTS

| | | | |
|---|---|---|---|
| 4,124,401 | * 11/1978 | Lee et al. | 51/307 |
| 4,151,686 | * 5/1979 | Lee et al. | 51/309 |
| 4,167,399 | * 9/1979 | Lee et al. | 51/309 |
| 4,220,455 | * 9/1980 | St. Pierre et al. | 51/307 |
| 4,231,195 | * 11/1980 | DeVries et al. | 51/307 |
| 4,234,661 | * 11/1980 | Lee et al. | 51/309 |
| 4,241,135 | * 12/1980 | Lee et al. | 51/309 |
| 4,246,006 | * 1/1981 | Phaal | 51/309 |
| 4,247,304 | * 1/1981 | Morelock | 51/309 |
| 4,381,271 | * 4/1983 | Hayden | 51/309 |
| 5,010,043 | * 4/1991 | Ringwood | 51/307 |

FOREIGN PATENT DOCUMENTS

| | | | |
|---|---|---|---|
| 0 010 257 | 10/1979 | (EP) | C04B/35/52 |
| 0 012 966 | 12/1979 | (EP) | C04B/35/56 |
| 0 061 605 | 3/1982 | (EP) | C09K/3/14 |
| 1 577 639 | 8/1968 | (FR) . | |
| 6-199571 | 7/1994 | (JP) . | |

OTHER PUBLICATIONS

Noriyuki, "Wear Resistant Ceramic Material and its Production" Patent Abstract of Japan, vol. 018, No. 558 (C–1264) Oct. 25, 1994.

* cited by examiner

*Primary Examiner*—Michael Marcheschi
(74) *Attorney, Agent, or Firm*—Flehr Hohbach Test Albritton & Herbert, LLP

(57) ABSTRACT

The present invention relates to a method for producing abrasive grains. According to the invention the method is characterised by the steps of manufacturing a polycrystalline body comprising diamond particles in a matrix of silicon carbide and silicon, or alternatively metal-silicon-carbon or boron-silicon-carbon phases, and crushing the polycrystalline body into grains. The invention also relates to abrasive grains produced by the method.

22 Claims, 5 Drawing Sheets

FIG_1

FIG_3

FIG_2

FIG_4a

FIG_4b

FIG_4c

FIG_5a

FIG_5b

FIG_5c

US 6,179,886 B1

METHOD FOR PRODUCING ABRASIVE GRAINS AND THE COMPOSITE ABRASIVE GRAINS PRODUCED BY SAME

FIELD OF THE INVENTION

The present invention refers to a method for producing abrasive grains and to the abrasive grains produced by this method.

BACKGROUND OF THE INVENTION

There is a general need of superhard materials for many different fields of application. The materials may be working on or being in contact with steel, non-iron metals, paper, polymers, concrete, stone, marble, soil, cemented carbide and grinding wheels of aluminum oxide, silicon carbide, diamond or cubic boron nitride etc.

Commonly synthetic diamond powders are produced having sizes less than 600 μm. For several fields of application, for instance drilling, grinding, machining of leather, rubber, and wood, larger grains are needed. Grains comprising diamond can be produced from diamond composite materials comprising a diamond skeleton (self-bonded diamonds with a small amount of or no bonding material) or comprising diamond particles bonded by a matrix comprising ceramic phases produced by sintering diamond particles in the presence of such materials, by high pressure and high temperature methods, or by hot press methods.

Large abrasive grains are produced from diamond composite materials like Ballas, Carbonado etc. with fine diamond particles. These materials are e.g. produced by sintering in high-pressure chambers, with subsequent crushing of the composite and classification of the abrasive grains.

Because of the diamond instability and tendency to graphitize, the heat treatment is done in conditions of diamond stability at high temperatures, 1300–1600° C., in high-pressure chambers with pressures of 30.000–60.000 atm (HP/HT).

The drawbacks of methods using high pressure is that the manufacturing technology is rather complex and requires special equipment, e.g. presses and dies. The consequenses are high production costs, limited production capacity, and limited shapes and sizes of the diamond composite bodies.

There are some patents describing the production of abrasive grains:

A method for producing diamond-containing abrasive grains is disclosed in the patent EPO 0,435,501. The method includes crushing of a diamond compact consisting of a diamond skeleton being 70–90% by volume and silicon, silicon carbide and/or metal silicide preferably to small sized fragments of about 1,5 mm. The diamond compact is preferably made by sintering a mixture of diamond, silicon, silicon carbide and/or metal silicide in a high-pressure chamber. After crushing of the diamond compact the fragments may be sintered as they are in HP/HT conditions to give a hard product. Alternatively a metal or second phase may be included to the fragments to infiltrate the fragments during the sintering and compacting. The abrasive grains produced by this method may have insufficient strength due to a high content of diamond in the crushed compact. The initial diamond in the compact has been sintered to form a continuous skeleton. A diamond skeleton is brittle and therefore the grains may be brittle. Furthermore, the compact is made with a high-pressure/high-temperature process.

U.S. Pat. No. 4,224,380 describes the production of a compact of self-bonded abrasive particles (diamonds and/or CBN) with an interconnected network of pores dispersed throughout. The compact is produced by bonding a mass of abrasive particles into a self-bonded body through the use of a sintering aid material under high pressure and high temperature (HP/HT). The body includes said particles in a self-bonded form and said material infiltrated throughout the body. The body is then treated to remove the infiltrated material to thereby produce a compact consisting of the self-bonded abrasive particles. The drawback of this method is the use of high pressure and high temperature.

Several patents reveal techniques to produce diamond abrasive grains without using high pressure and high temperature:

U.S. Pat. No. 3,520,667 describes the production of silicon carbide coated diamond abrasive grains by suspending the diamond particles in a gaseous atmosphere comprising a volatile silicon compound and forming by thermal decomposition of the silicon compound a silicon carbide layer on the particles. The decomposition takes place preferably by forming a fluidised bed with diamonds suspended in a mixture of gases, which includes hydrogen and the volatilised silicon compound. The bed is heated to 1300–1500° C. to cause decomposition of the silicon compound and the formation of the silicon carbide coating on the dispersed and suspended diamond particles. Drawbacks with this method of producing grains is that the silicon carbide coated diamonds are individual particles and not bonded to each other into agglomerates, thereby reducing the size of the abrasive grit and the subsequent application field.

U.S. Pat. No. 4,606,738 and EPO 0,061,605 describes composite abrasive particles comprising a core abrasive crystal (diamonds or CBN) and a silicon carbide coating on said core crystal. The abrasive particles are preferably made by infiltrating core crystals coated with non-diamond carbonaceous material with fluid silicon. Then the silicon is leached out from the produced mass of core crystals and matrix of silicon carbide and silicon. The resulting leached mass is sub-divided and the composite abrasive particles are recovered. Another disclosed embodiment is the aggregates of the composite abrasive particles that are interconnected by a matrix of silicon carbide, which has an open structure. Drawbacks of this method are that the produced abrasive grains, i.e. diamond particles coated by silicon carbide, have sizes equivalent to the size of the initial diamond particles. Thus there is a limit for preparing large, cheap abrasive grains of sizes several times greater than that of initial diamond particles and greater than industrially produced diamond particles. Aggregates produced by the given method are porous and have not high strength, which limit their field of application.

SUMMARY OF THE INVENTION

In the process according to the present invention in the case of using pure silicon as the infiltrate melt into a diamond body, the products besides diamond will be silicon carbide and residual silicon filling the porosity and resulting in a fully dense body. Materials properties like hardness, toughness and rigidity will be influenced by the amount, distribution and particle size of the different phases.

However, by using a silicon alloy a more complex material will be formed with wider possibilities to prepare materials with desired overall properties for different applications. Besides the phases mentioned above the alloying element could form either carbides with the non-diamond graphite present at the initial stage of the process or form a metal silicide. Residual silicon alloys of varying composition (or even silicon) will be present or small amounts of metal carbosilicides might form.

Boron carbide ($B_4C$), which is harder than silicon carbide will form resulting in a harder final body, when using boron as an alloying element in silicon. Other strong carbide formers like Ti, Zr, Nb and Ta are predicted from Gibbs energy calculations to form metal carbide rather than metal silicide. The presence of these carbide particles in the microstructure could increase the toughness and not deteriorate high temperature properties. However, kinetic factors might cause some silicide formation. The presence of metal silicides will increase the toughness at low and medium temperatures, but some silicides like those from the iron group will not be beneficial for high temperature use above 1000° C. Other silicides like molybdenum disilicide are known to have good high temperature properties especially in air where initial oxidation forms a silica layer protecting from further oxidation.

The process according to the present invention is a low-pressure process considerably below the pressures required for the diamond stable region and will allow low-cost mass production also of large bodies. A novel feature of our production process is that it does not need special presses and dies. For example we do not need to use expensive hot isostatic pressing (HIP) equipment for gas pressures up to 2 kbar. In this case, both the HIP equipment and running costs of the process are very high and the process requires a gas-tight metal, glass or other encapsulation for transferring the pressure to the bodies to be sintered. Stringent safety precautions are in force when using such high gas pressures, and during operation and maintenance of such equipment.

Hot pressing (HP) equipment is available at lower costs where pressures typically from 30 to 1500 bars, are applied to the diamond body by graphite punches during sintering. The production capacity is limited. The method of the present invention avoids these limitations.

From a production cost point of view the pressure used should be below about 50 bar, preferably below 30 bar. At this pressure very much simpler production equipment can be used and complex shapes can be made.

The lowest production cost and large-scale manufacture is achieved with furnaces using ambient pressure of inert gas or a slight overpressure less than 2 bars. Vacuum can also be used. Large batch production capacity lowers costs drastically and the sizes of the composite components can be increased.

The use of nitrogen as a low-cost inert gas is possible in the latter case as a low pressure gas. However, increasing nitrogen pressure above 2 bars at the melting temperature of silicon or silicon alloys might cause a dramatic reaction between silicon and nitrogen to form silicon nitride. This reaction is strongly exothermic and once started it might be uncontrolled increasing local temperatures destroying the diamonds and the composite.

The object of the present invention is to provide a method for producing diamond abrasive grains having excellent properties in a simple and cost effective way and the abrasive grains produced thereby.

More specifically, the object of the invention is accomplished by a low pressure method for producing abrasive grains, characterized by the steps of manufacturing a polycrystalline body comprising diamond particles in a matrix of silicon carbide and silicon, or alternatively in a matrix of silicon carbide, and other metal-silicon-carbon or boron-silicon-carbon phases; and crushing the polycrystalline body into grains.

In a preferred embodiment a polycrystalline body comprising about 20–70 vol.-% of diamond particles, about 0.1–75 vol.-% of silicon carbide and about 1–40 vol.-% of silicon, or alternatively other metal-silicon-carbon or boron-silicon-carbon phases is manufactured and the polycrystalline body is crushed into grains.

In another preferred embodiment a polycrystalline body comprising at least approximately 20 vol.-% of diamond particles, at least approximately 5 vol.-% of silicon carbide, preferably more than approximately 15 vol.-% of silicon carbide, and silicon, or alternatively other metal-silicon-carbon or boron-silicon-carbon phases, the Young's modulus exceeding 450 GPa, is manufactured and the polycrystalline body is crushed into grains.

In yet another preferred embodiment a polycrystalline body comprising at least approximately 29 vol.-% of diamond particles, at least approximately 14 vol.-% of silicon carbide, and silicon alternatively other metal-silicon-carbon or boron-silicon-carbon phases, the Young's modulus exceeding 540 GPa is manufactured and the polycrystalline body is crushed into grains.

In a further preferred embodiment a polycrystalline body comprising at least approximately 46 vol.-% diamond particles having sizes of about 30 $\mu$m at the most, at least approximately 5 vol.-% of silicon carbide, preferably more than 15 vol.-% of silicon carbide, and silicon, or alternatively other metal-silicon-carbon or boron-silicon-carbon phases, the Young's modulus exceeding 560 GPa, is manufactured and the polycrystalline body is crushed into grains.

In yet a further preferred embodiment a polycrystalline body comprising at least about 54 vol.-% of diamond particles, at least approximately 60% of the diamond particles having sizes of at least 50 $\mu$m, at least approximately 5 vol.-% of silicon carbide, preferably more than 15 vol.-% of silicon carbide, and silicon, or alternatively other metal-silicon-carbon or boron-silicon-carbon phases, the Young's modulus exceeding 650 GPa, is manufactured and the polycrystalline body is crushed into grains.

In all embodiments the manufacturing of the polycrystalline body comprises the following steps: forming a work piece from diamond particles, heating the work piece and controlling the heating temperature and heating time so that a certain desired amount of graphite is created by graphitization of diamond particles, thereby creating an intermediate body, and infiltrating silicon or alternatively silicon alloy into the intermediate body. The polycrystalline body is crushed into grains having a size of at least about 40 $\mu$m and the work piece is formed of diamond particles having a size in the range of approximately 3–500 $\mu$m. The amount of graphite created during the heat treatment of the work piece is about 1–50 wt-%, preferably 6–30 wt-% of the amount of diamond and the heating temperature during graphitization is lower than 1700° C. The heating temperature and heating time needed for the graphitization is empirically determined for the heating equipment used. The work piece is formed with a porosity of about 25–60 vol.-%. A certain amount of carbon can be deposited in the work piece by exposing the work piece to a gaseous hydrocarbon or hydrocarbons at a temperature exceeding the decomposition temperature for the hydrocarbon or hydrocarbons. Preferably, at least some graphitization of the diamond particles is done before the work piece is exposed to a gaseous hydrocarbon or hydrocarbons at a temperature exceeding the decomposition temperature for the hydrocarbon or hydrocarbons. The work piece is preferably formed from a homogeneous mixture of diamond particles of various sizes eventually with the addition of a binder and the forming of the work piece is made in a mould, the heat treatment and the infiltration of silicon or alternatively silicon alloy being made after the work piece has been taken out of the mould.

The present invention relates also to abrasive grains manufactured by the low pressure method described above, the grains being characterized in that they comprise diamond particles, silicon carbide and silicon, or alternatively diamond particles, silicon carbide, other carbides such as metal carbides or boron carbides, silicon, eventual metal suicides, alloying element carbosilicides and/or silicon alloy, the diamond particles being placed in a matrix of silicon carbide and silicon, or alternatively silicon carbide, other carbides, silicon, other elements and eventual silicides, the mean value content of diamond particles, silicon carbide and silicon in the grains being about 20–70, 0.1–75 and 1–40 vol.-%, respectively.

In a preferred embodiment, the mean value content of diamond particles, silicon carbide and silicon in the grains are about at least 20, at least 5, and 1–40 vol.-%, respectively.

In another preferred embodiment, the mean value content of diamond particles, silicon carbide and silicon in the grains are about at least 29, at least 14, and 1–40 vol.-%, respectively.

In yet another preferred embodiment, the mean value content of diamond particles, silicon carbide and silicon in the grains are at about least 46, at least 5, and 1–40 vol.-%, respectively, and the diamond particles have sizes of about 30 $\mu$m or less.

In a further embodiment, the mean value content of diamond particles, silicon carbide and silicon in the grains are about at least 54, at least 5, and 1–40 vol.-%, respectively, and about at least 60% of the diamond particles have sizes of at least 50 $\mu$m.

The diamond particles in the grains have a size of about 3–500 $\mu$m and a thermal stability factor less than 1.2, preferably less than 1.1.

BRIEF DESCRIPTION OF THE DRAWINGS

The invention will now be described with reference to the enclosed Figures, of which.

DETAILED DESCRIPTION OF THE INVENTION

An object of the present invention is to produce abrasive grains with improved properties. The technical result is obtained by production of grains of sizes exceeding 40 $\mu$m by crushing a composite material comprising separate diamond particles placed in a matrix formed by silicon carbide and silicon, or alternatively silicon carbide, carbides of the alloying elements such as metal carbide or boron carbide, eventual free silicon, alloying elements, metal silicides and/or silicon alloy, after which the grains sizes are classified.

Figure 1:
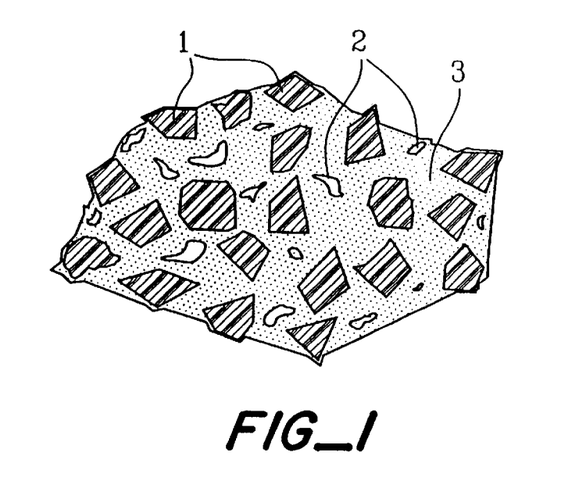
FIG. 1 shows the schematic structure of a diamond containing grain produced by the present method, where <<1>> is diamond, <<2>> is silicon carbide and <<3>> is silicon.

The schematic structure of a diamond containing grain produced by the claimed low pressure method is presented in FIG. 1, where <<1>> is diamond, <<2>> is silicon carbide and <<3>> is silicon. As FIG. 1 shows the claimed grains do not have a continuous diamond skeleton as some of the earlier known materials. In the present invention, the separate diamond particles are bonded by a matrix of silicon carbide and silicon. This improves the breaking strength of the grains, especially under dynamic influences. At a crack development in the grain, the boundaries between diamond particles and the matrix will interfere the crack, thereby preventing a breakage. In diamond skeleton materials a crack development in the brittle diamond skeleton results in breakage of the whole grain. The fact that separate diamond particles are bonded by a matrix of silicon carbide and silicon which surrounds every diamond particle results in high thermal stability of the grains.

In the case when pure silicon has been used for the infiltration it is advantageous to leave the silicon in the polycrystalline body before the crushing step. The abrasive grain produced hereby includes diamonds bonded by silicon carbide and silicon. This makes possible to produce diamond grains of any size, and the size is only limited by the size of the polycrystalline body itself before the crushing. This is advantageous when producing large grains because there is no need to use large expensive diamonds for this.

The diamond containing composite used for production of grains by crushing comprises 20–70 vol.-% of diamond particles, 0.1–75 vol.-% of silicon carbide and 1–40 vol.-% of silicon and has a uniform structure due to the unique production method, which makes possible to unite diamond particles by a matrix of high rigidity and hardness with the diamond particles left intact.

The diamond composite used for crushing, is produced by forming a work-piece with porosity of 25–60 vol.-% from a mixture comprising diamond particles of sizes 3–500 $\mu$m, with a content greater than 95 vol.-% by well-known methods (pressing, slip casting, slurry casting etc.) with or without a binder, heat treating said work-piece in a medium of gaseous hydrocarbon(s) or in an inert medium (vacuum, inert gas) until the diamond content in the work-piece is reduced by no more than 50 wt-%, and subsequent infiltration of liquid silicon into the porous intermediate body. As a result a composite is produced, with predetermined shape and size.

The crushing of the composite is made by certain methods using certain equipment, for example, hydraulic press, metallic mortars, splined crusher, rotor crusher etc. The produced abrasive grains comprise diamond particles in a matrix of silicon carbide and silicon. The grains are ready to be used without additional machining as well as with ovalising the grains using standard methods, for example by a vortical ovaliser. The ovalised grains can be used in diamond pastes, diamond tools based on an organic matrix etc.

The optimum grain size is greater than 40 $\mu$m. The classification of grains smaller than 40 $\mu$m should be done by wet sieving or sedimentation instead of dry sieving, which is more expensive.

The same steps as described above for pure silicon, are used and applicable also when the intermediate body is infiltrated with silicon alloys. The abrasive grain produced in this case comprises diamonds bonded by a matrix comprising silicon carbide, and also metal-silicon-carbon or boron-silicon-carbon phases; such as metal carbide or boron carbide, the alloying elements used, metal suicides, metal carbosilicides and silicon alloys.

The properties of the abrasive grains depend on the composition and the size of the grains. In practice, composites of this type with a content of silicon less than 1 vol.-% and of silicon carbide less than 0.1 vol.-% are not produced. If the content of silicon carbide is greater than 75 vol.-% the abrasive properties of the grain decrease because of low diamond content. If the content of silicon is greater than 40 vol.-% the grains have low strength. Testing of grains produced by crushing of a polycrystalline composite body of the specified composition with diamond particles of sizes 3–500µm have shown good results.

The abrasive grains have a thermal stability factor less than 1.2, preferably less than 1.1, i.e. static strength of grains measured on standard method does not decrease more than 20%, (preferably 10%) after heat treatment at 1200° C. in inert medium.

The composite polycrystalline body according to the present invention is achieved by a low pressure process that uses graphitization of diamond for production of diamond abrasive grains. It is also possible to combine graphitization with pyrolytic deposition of carbon but not necessary. This signifies that the invention uses diamond graphitization, i.e. partial diamond transformation into graphite efficiently, and in a planned and controlled manner.

By submicron sized diamonds is meant diamond particles smaller than 1 µm and by small diamonds diamond particles smaller than 20 µm and more preferably smaller than 10 µm. Large sized diamonds, >20 µm, and very large diamonds, >60 µm, are also used, often in combination with small diamonds. In the process according to the present invention, diamonds of size 3–500 µm are preferably used.

Figure 2:
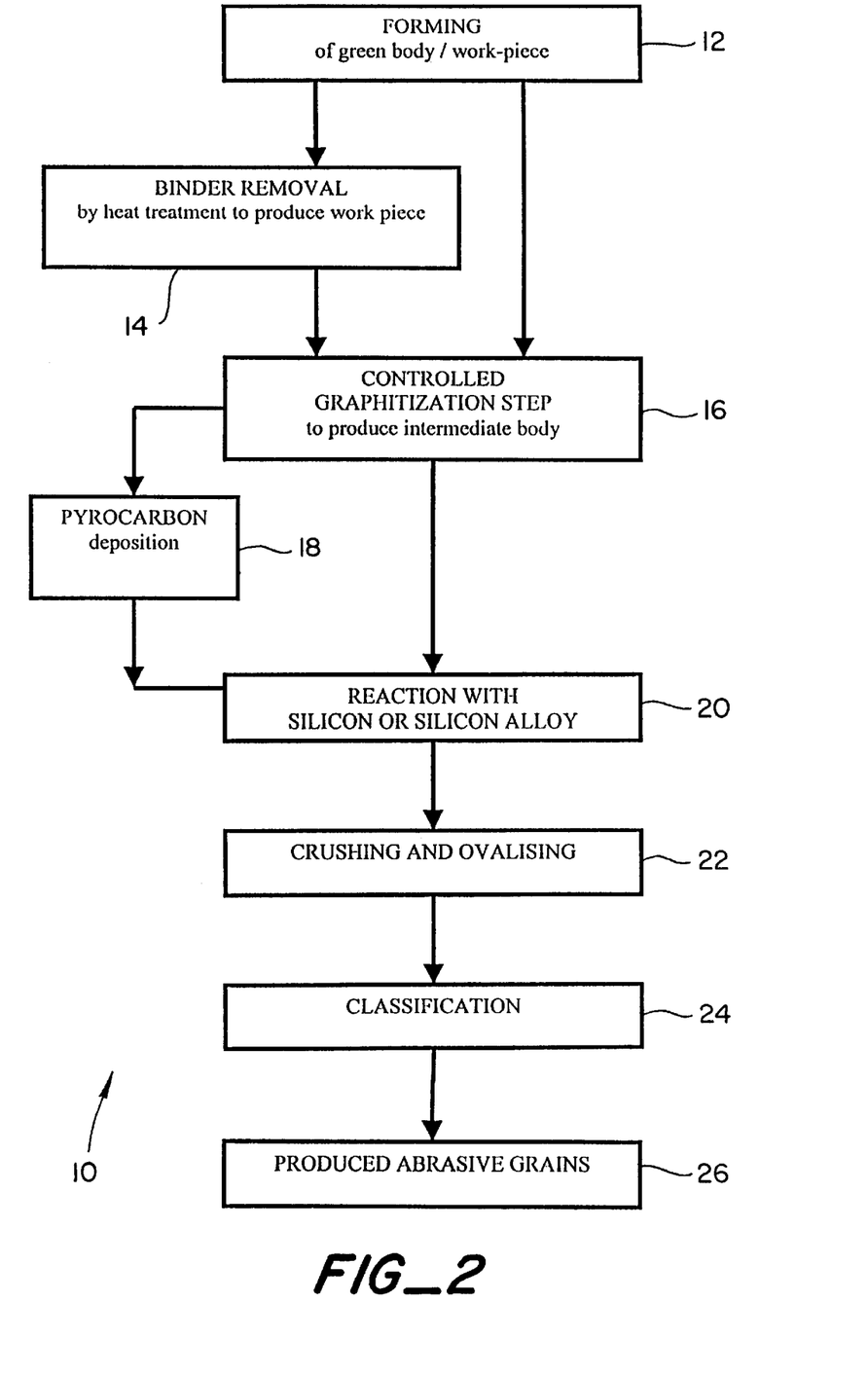
FIG. 2 shows the preferred steps of the method according to the invention in a flowchart.

FIG. 2 describes the preferred process steps 10 in a flowchart. The different steps of the process according to the present invention are described by the following:

Forming of a Green Body is done from a mixture of diamond particles of various sizes together with a small amount of a temporary or permanent binder, or without any binder in the Forming step 12. The forming is done using established techniques, for instance by pressing, using slip and slurry casting, injection moulding etc. In the case when a mould is used for forming, the green body is usually removed from the mould.

Production of a Work-piece is done by evaporating or hardening and decomposing the present solution agents and/or binders in the green body in the Binder Removal step 14. If a green body is produced without any binders it is considered as a work-piece, in which case the Binder Removal step 14 is omitted, and instead the process proceeds directly to the Controlled Graphitization step 16. The final amount of binder in the work-piece is approximately 5 wt.-% or less. For provision of a uniform and controllable graphitization throughout the whole work-piece volume, it is undesirable to have impurities from the binder present therein. These may catalyse or inhibit the graphitization process. A reason for having not less than approximately 95 wt.-% diamonds in the work-piece is that precise control of the amount of carbon that will be present and where, is only possible in a body without fillers and for a minimum amount of binder.

Heat Treatment of a Work-piece for Obtaining an Intermediate Body

The work-piece with a diamond content of 95–100 weight-% of the total mass is heat treated to obtain an intermediate body, by using controlled graphitization of diamond, or a combination of controlled graphitization of diamond and deposition of pyrolytic carbon, hereby referred to "pyrocarbon", in the Controlled Graphitization step 16. When combined, it is preferred to use graphitization prior to pyrocarbon deposition.

Graphitization for Obtaining an Intermediate Body

During graphitization the work-piece (or the intermediate body with deposited pyrocarbon) is heat treated in vacuum or in a controlled atmosphere, preferably an inert gas at 700°–1900° C., preferably at 1000°–1700° C., and best controlled at 1100–1500° C. Usually graphitization is slow at temperatures lower than 1000° C., but may proceed at even lower temperatures depending on catalytic effects, the atmosphere and equipment used, for instance. At temperatures higher than 1900° C. the rate of graphitization is so high that it will be difficult to control with required precision, when using low quality diamonds. The vacuum pressure is preferably lower than 1 mmHg. As inert gas nitrogen, argon (or other noble gases), hydrogen or helium may be used, which provides for the absence of oxygen in the system. The process is not restricted to using any specific pressures, but can be used in a wide pressure range. So the inert gas pressure is less important and is chosen according to applicability of the process, e.g. 760 mmHg. A low pressure is preferred for to various reasons, e.g. economical, industrial and efficiency reasons.

After the Controlled Graphitization step 16, different embodiments of the present invention may be employed. In one embodiment, pyrolytic deposition of carbon into the graphitized intermediate body is performed at Pyrocarbon step 18. Alternatively, in a second embodiment the intermediate body produced in the Controlled Graphitization step 16 is subjected directly to the reaction with Silicon or Silicon Alloy step 20, and pyrocarbon deposition in step 18 is omitted.

Pyrolytic Deposition of Carbon Into the Graphitized Intermediate Body

During pyrolytic deposition of carbon into the graphitized intermediate body at step 18 (or into the work-piece), the body is exposed to a gas of hydrocarbon or hydrocarbons at a temperature that exceeds the decomposition temperature for the current gas or gases, for example natural gas at T=750°–950° C., or gas containing acetylene, methane, ethane, propane, pentane, hexane, benzene and their derivatives at T=5100–1200° C.

The Infiltration of Silicon or Silicon Alloy Into the Intermediate Body is performed in the reaction with Silicon or Silicon Alloy step 22 and carried out by well-known methods. The infiltration may preferably be done outside of a mold for instance by melting solid silicon or silicon alloy, by liquid silicon or silicon alloy feeding on an outer surface of an intermediate body, by using differential vacuum infiltration techniques or by dipping the intermediate body into liquid silicon or silicon alloy. There is also a possibility to apply the silicon or silicon alloy by infiltration of vaporous silicon or silicon alloy or by the chemical methods, for instance by using techniques similar to sol-gel, chemical vapor deposition etc., followed by a high temperature reaction.

During the infiltration, when pure silicon is used, the chemical reaction of non-diamond carbon and silicon takes place resulting in the formation of silicon carbide, which together with eventual free silicon forms the matrix of the produced composite material body.

During the infiltration of pure silicon, when a silicon alloy is used, the chemical reaction of non-diamond carbon and silicon takes place resulting in the formation of silicon carbide, which together with eventual free silicon forms the matrix of the produced composite material body. During the infiltration, when a silicon alloy is used, the chemical reaction of non-diamond carbon and silicon takes place resulting in the formation of silicon carbide, and the final body comprises also other phases of metal-silicon-carbon or boron-silicon-carbon. These metal-silicon-carbon or boron-silicon-carbon phases comprises silicon carbide, metal carbides, boron carbides, metal silicides, boron silicides, metal carbosilicides, alloys of metals with silicon and silicon. These phases form the matrix of the produced body.

The silicon alloy is characterized in that said melt is a silicon alloy comprising at least one metal from the group consisting of Ti, Zr, Hf, V, Nb, Ta, Cr, Mo, W, Mn, Re, Fe, Co, Ni, Cu, Ag, Al, or the element B or Ge. When referring to metals Germanium (Ge) is considered as a metal. The heat treatment and infiltration of the diamond containing work-piece is performed at a pressure of less than about 50 bars of an inert gas, preferable below 30 bars, and most cost efficient below 2 bars inert gas pressure or in vacuum. The infiltration is carried out at temperatures higher than the melting temperature of the melt, i.e. at temperatures higher than 1450° C. for most of the silicon alloys or at temperatures higher than 1100° C. when using alloys containing Al, Cu, Ag, Fe, Co, Ni, Mn, or Ge. The temperature of the infiltration should be kept less than 1700° C., preferably less than 1600° C.

It is possible to make silicon alloys with the aforementioned alloy metals or boron or germanium. Their liquidus temperatures are low, which is important. The graphitization process is better controlled and these silicon alloys have moderate vapor pressure at temperatures in the interval 1200–1700° C. Finally, elements from the selected alloying elements form additional phases in the material, which give the diamond composite valuable properties. These phases can be metal carbides, metal silicides, metal alloys with silicon or ternary metal carbosilicides or the corresponding phases of boron.

Good results are obtained when using silicon alloys, in which content of alloying element in the silicon alloy is as follows:

from Ti, Zr, or Hf is less than 50 wt-%, preferably less than 20 wt-%.
from V, Nb, or Ta is less than 20 wt-%, preferably less than 10 wt-%.
from Cr and Re is less than 45 wt-%, preferably less than 20 wt-%.
from Mo and W is less than 10 wt-%, preferably less than 5 wt-%.
from Mn, Fe, Co, or Ni is less than 60 wt-%, preferably less than 20 wt-%.
from Cu and Ag is less than 30 wt-%, preferably less than 15 wt-%.
from Al and Ge is less than 50 wt-%, preferably less than 20 wt-%.
from B is less than 20 wt-%, preferably less than 8 wt-%.

Infiltration of liquid silicon alloys into the intermediate body is performed by the most suitable methods, for example, by melting of the corresponding alloy directly on the surface of intermediate body, or, for example, by dipping of intermediate body in the corresponding melt or, for example, by pouring of the corresponding melt on surface of intermediate body. When using alloys it ensures simple infiltration process connected with the lower melting temperature of alloys compared with individual substances, better wetting of the intermediate body surface and more intensive penetration into pores of the intermediate body. As a result of infiltration a practically non-porous material comprising diamond, silicon carbide and additional phases, content of which is determined by the type of the used metals in the alloy, is produced. Such additional phases can be metal silicides (for example $NiSi_2$) and/or metal carbides (for example TiC and NbC) and /or alloys of metals (for example Ag) with silicon, or any combination thereof.

Content of metals (besides silicon) in the final dense diamond composite is less than approximately 30 wt-%, preferably less than 20 wt-%. For some metals the content is naturally limited by the composition of the used silicon alloy and the maximum porosity of the initial work-piece. Thus, for metals from the group of V, Nb, or Ta their content in material is less than 10 wt-%, preferable less than 5 wt-%. For metals from the group of Mo and W their content in material is less than 5 wt-%. Finally, for the metals Fe, Co, and Ni the material content should preferably be less than 10 wt-%.

Crushing (Step 22) of the Infiltrated Body and Classification (step 24) of the Produced Abrasive Grains (Step 26).

The crushing of the infiltrated body is made by using certain equipment, e.g. hydraulic press, metallic mortars, splined crushers, rotor crushers etc. The produced abrasive grains comprise diamond particles in a matrix of silicon carbide and silicon or alternatively silicon carbide, other carbides, eventual free silicon, alloying element, metal silicides and/or silicon alloy. Sometimes the matrix also comprises small diamond particles.

The crushing is carried out in different steps. A first coarse crushing is made followed by selective crushing with subsequent classification, screening of grains of certain sizes, using standard screen set. Sometimes the grains are ovalised, round off, by a vortical ovaliser; a mixture of ferromagnetic particles and the crushed grains are rotated by a magnetic field with a rotation frequency 3000 rpm. A final screening is then made.

The produced grains are ready to use without additional machining as well as with ovalising using standard methods for example, by vortical ovaliser. The ovalised grains can be used in diamond pastes, diamond tools based on an organic matrix etc.

The optimum grain size is greater than about 40 $\mu$m. The classification of grains smaller than 40 $\mu$m must be done by more expensive techniques.

Of particular importance is the formation of carbon in the body. Non-diamond carbon in the body may be achieved by the following different ways 1. Graphitization by heat treatment of the diamond particles in the work-piece to transform the surface layer of diamond to graphite.
2. Deposition of pyrolytic carbon into the body.
3. During the heat treatment for the silicon or silicon alloy infiltration additional graphitization is made.
4. Eventual residual pyrolytic carbon from binders.

The determination of contributions to total amount of non-diamond carbon is made by a) establishing the eventually used amount of pyrocarbon.
b) establishing the degree of graphitization during the heat treatment for the silicon or silicon alloy infiltration.
c) establishing the amount of any residual pyrolytic carbon from binders.

d) primary graphitization makes up the additional carbon amount needed.

Thus one feature of this invention is the ability to govern and vary the degree of diamond graphitization by simultaneous control of process and material parameters such as shape of the time-temperature curve, i.e. temperatures, holding times and heating rates, size, type and quality of and impurities in the diamond particles, the atmosphere and the pressure. Control considerations include e.g.:

The relative volume of silicon, alloying element and eventual silicides or alternatively residual pores, silicon carbide, any other carbides of the alloying elements used, and diamond in the final body depend upon the degree of graphitization which consequently has to be executed with precise control.

For submicron and small diamond particles it is important that the graphitization does not go so far that the particles disappear. The graphitization should be less than 50 wt-% and preferably lie between 6–30 wt-%.

When mixing small diamond particles with large particles, the size of the small particles must be carefully chosen so that the small particles will not disappear, unless so desired, and the large particles will be sufficiently graphitized. The graphitization should be less than 50 wt-% and preferably lie between 6–30 wt-%.

The predominant method of governing the degree of graphitization is to choose the right shape of the temperature-time curve from about 1000° up to about 1700° C., in vacuum or in inert gas at pressure preferably up to 2 bars, as a function of diamond particle size and quality.

For different desired degrees of graphitization, suitable for materials aimed at different technological applications, different shapes for these curves have to be chosen.

By choosing the correct heat treatment, it is possible to achieve a final body with very low porosity, no graphite and a well-balanced composition between diamond, silicon carbide and silicon, or alternatively diamond, silicon carbide, other carbides of alloying elements used, and metal silicide, alloying element carbosilicides and eventual silicon. If the graphitization degree is low the final composite will contain a larger amount of silicon, eventual metal silicide, alloying element carbosilicides and or porosity. The higher the degree of graphitization, the more silicon carbide, and other carbides the final body will contain.

An increase of the temperature and holding time increases in general the amount of graphite produced. The velocity of the graphitization front movement from the surface of a diamond particle into the diamond particle is determined also by the crystallographic direction and amount of material impurities and defects. When all other conditions are the same, the velocity of the graphitization front propagation will be the same for large and small diamond particles. However, the difference in particle size determines different relative graphitization degrees for large and small particles. The degree is significantly higher for small particles and is proportional to the specific area of the diamond. Thus it is important to choose optimal conditions of the heat-treatment in order to control the production of a material by the proposed method and it is of particular importance when using small diamond particles.

For small particles it is very important to accelerate the heating rate in the temperature area greater than about 1000°, because the graphitization rate depends strongly on the temperature. Thereby the graphitization decreases (compared to slower heating to the same temperatures) and the degree of graphitization does not exceed the desired limit ($\leq 50$ wt.-%). This makes subsequent liquid silicon or alternatively silicon alloy infiltration of the intermediate body possible. The infiltration throughout the body will not occur unless pores of sufficient size exist throughout the body. The process of graphitization is delicate to control and realize. It must be adjusted to the equipment and material that is used. Some of these parameters have to be empirically related to match the equipment and materials that are used.

Figure 3:
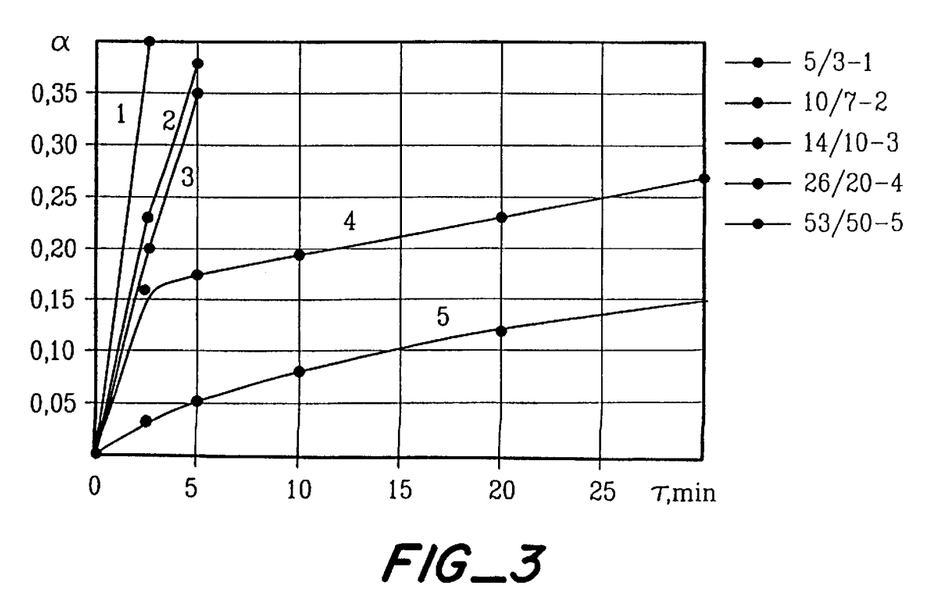
FIG. 3 shows the degree of graphitization versus the graphitization time at one specific temperature.

FIG. 3 shows the degree of graphitization, $\alpha$, versus the graphitization time, $\tau$, at one specific temperature for diamond particles of different sizes. As can be seen the relative graphitization of the particle is more rapid for smaller diamond particles (curves 1, 2 and 3 having particle sizes of 5/3, 10/7 and 14/10 $\mu$m, respectively) compared to larger particles (curves 4 and 5 having particle sizes of 28/20 and 63/50, respectively).

One of the advantages with the graphitization process of the present invention is the improvement of the diamond surface. Generally the cost of diamonds is related to the quality and size. It is well known that the surface layer of most diamond particles has defects. Defects and impurities on the surface will reduce mechanical and chemical stability. It is desired not to have surface defects and impurities while still not using expensive, high quality diamonds. This is achieved by intentionally transforming the surface layer of the diamond to graphite by heat treatment. The graphitization starts on the surface, gradually propagating deeper into the particle. Furthermore not only the diamond surface may be improved by diamond graphitization but also the bulk properties. Diffusion processes start in the diamond when it is heated. By this diffusion process metallic and other impurities are moved to the surface of diamond and embedded in the silicon carbide or silicon, or alternatively silicon carbide, any other carbide of alloying element, eventual silicon, metal silicide, alloying element and/or silicon alloy. As the graphitization transforms the defective layer on the diamond surface it will result in improvement of the total particle properties and as a consequence, of the whole composite material. To achieve these improvements the graphite layer surrounding the diamond particle should be at least 50 nm, preferably thicker than 200 nm. The graphitization should not be less than 1 wt-% and preferably be at least 6 wt-%.

Another very important achievement of the diamond graphitization is the extremely strong bond of the formed SiC, coating each individual diamond particle. The diamond will be bonded to the matrix and in a demanding application it will not be pulled out.

During the total manufacturing process leading to a dense or near dense body with no graphite, certain criteria are established:

The porosity of the materials consists of pores of different size; larger pores and smaller pores. The work-pieces have a certain volume percentage of porosity and certain pore sizes before the heat treatment and the silicon/silicon alloy infiltration, determined by the diamond particle size and size distribution, by other materials that are present or added and eventual compacting of the green bodies. The diamond content is decreasing corresponding to the amount of graphite that is formed during the graphitization of diamonds. The total amount of non-diamond carbon in the body, including added pyrocarbon or from possible residual of binder, must be controlled in order to achieve final material with an optimum content of silicon carbide (produced in the reaction between the non-diamond carbon and the silicon) relative to elemental silicon, the elemental silicon filling up the porosity creating a dense or near dense body—if pure silicon is used for infiltration. If a silicon alloy is used instead, the same as above applies but the products comprise also other carbides or silicides of the alloying elements, and eventually other carbosilicides.

The initial porosity and degree of graphitization influence the properties of the final material. At a work-piece porosity of greater than 60 vol.-%, the strength of the work-piece is insufficient for realization of the subsequent steps of the process. When the porosity of a work-piece is less than 25 vol.-%, it is difficult to infiltrate silicon or silicon alloy into the intermediate body, and the final body will have significant residual porosity. The same problems appear if the graphitization degree is more than 50 wt-% or if the amount of deposited pyrocarbon and residual carbon from binders is more than 25 wt-%, because the limiting small pores will not be sufficiently large (due to too thick carbon layers). In such cases during silicon or silicon alloy infiltration, a dense layer of silicon carbide or alternative other carbides of the alloying elements used, is formed in the surface zone of the intermediate body, which blocks the penetration of liquid silicon/silicon alloy into internal parts of said intermediate body.

Figure 4A:
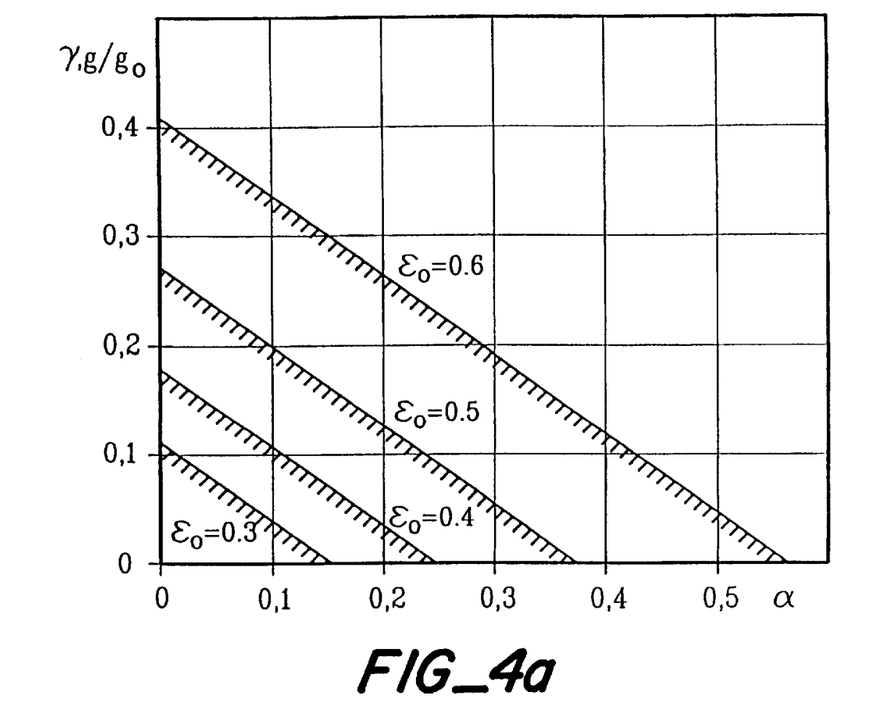
FIG. 4a shows the relationship between the amount of carbon ($\alpha$ and $\gamma$) inserted into the body at different initial porosity $\epsilon_0$ that meet the conditions of $\phi_D + \phi_{SIC} < 1$, in the final body.

For a given initial porosity of the work-piece $\epsilon_0$, the maximum amount of carbon, prepared by graphitization, deposition of pyrocarbon and any possible residual pyrolytic carbon from binders, that at a later processing step will allow reaction between all of the carbon with infiltrated silicon to form silicon carbide, is illustrated in FIG. 4a. The relative amounts of graphite ($\alpha$) and pyrocarbon plus residual carbon from binders ($\gamma$) for any acceptable combination hereof are also distinguishable from this figure. The process is limited by the total amount of carbon related to the porosity. At a certain initial porosity, the final composite will contain a large amount of silicon or if the amount of carbon is too small. If the amount of carbon is too large, certain amounts of residual carbon will be left in the final composite, which is undesired because the carbon acts like defects in the material. See also the two graphs, FIG. 4b and FIG. 4c that shows the relationship between the graphitization degree for a certain initial porosity and the composition of the final composite. As can be seen the variation of the diamond, silicon carbide and silicon components is linear. As the graphitization degree increases, the carbon content increases while the diamond and silicon contents decrease.

Figure 4B:
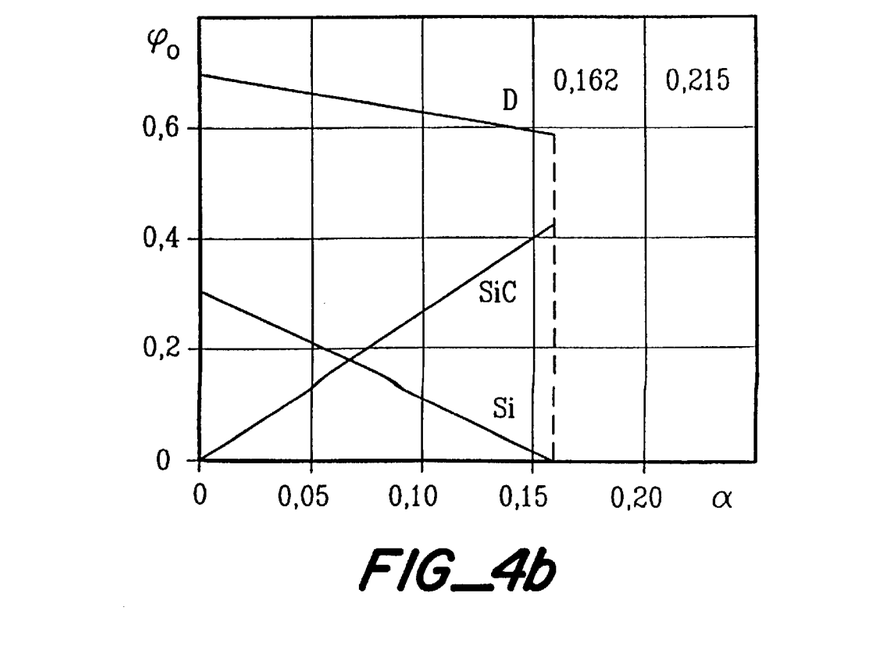
FIGS. 4b and 4c show the relationship between the final body composition and diamond graphitization degree in the body, with initial work piece porosity $\epsilon_0 = 0.3$ and $\epsilon_0 = 0.5$, respectively, when pure silicon is used for infiltration.
Figure 4C:
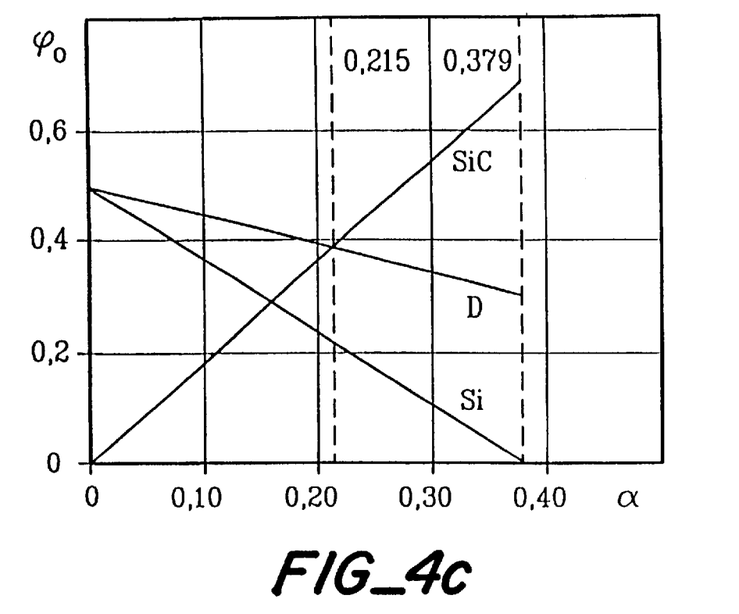

These figures have been produced by using these following equations under the conditions that the total body volume does not change and that there are no pores in the produced body:

The volume content of diamond in the final material is:

$$\phi_D = (1-\epsilon_0)(1-\alpha) \quad [\text{eq. 1}]$$

where $\alpha$ is the graphitization degree, i.e. amount of graphite, $\epsilon_0$ is the initial porosity of the work-piece.

The volume content of silicon carbide in the final material is determined by the amount of carbon that has reacted with silicon:

$$\phi_{SiC} = (1-\epsilon_0)(\gamma+\alpha)\rho_D M_{SiC}/(\rho_{SiC} M_C) \quad [\text{eq. 2}]$$

where $\rho_D$ and $\rho_{SiC}$ are the densities of diamond and silicon carbide, respectively, $M_{SiC}$ and $M_C$ are the molecular masses of silicon carbide and carbon, respectively. The volume content of silicon in the final material is:

$$\phi_{Si} = 1 - (\phi_{SiC} + \phi_D) \quad [\text{eq. 3}]$$

To perform the production of non-porous material it is necessary to meet the condition of $\phi_D + \phi_{SiC} < 1$. This condition is fulfilled by the values of $\alpha$ and $\gamma$ falling into the areas shown in FIG. 3a. Therefore the amount of pyrocarbon and binder residues that may be inserted to meet the condition of $\phi_D + \phi_{SiC} < 1$ in the final material depends to a large extent on the graphitization degree. The solutions of equations 1, 2 and 3 at $\gamma=0$ gives the relationship between the diamond composite composition and initial porosity of the work-piece according to FIG. 3b–3c.

Similar calculations may be done for the case when silicon alloys are used.

Figure 5A:
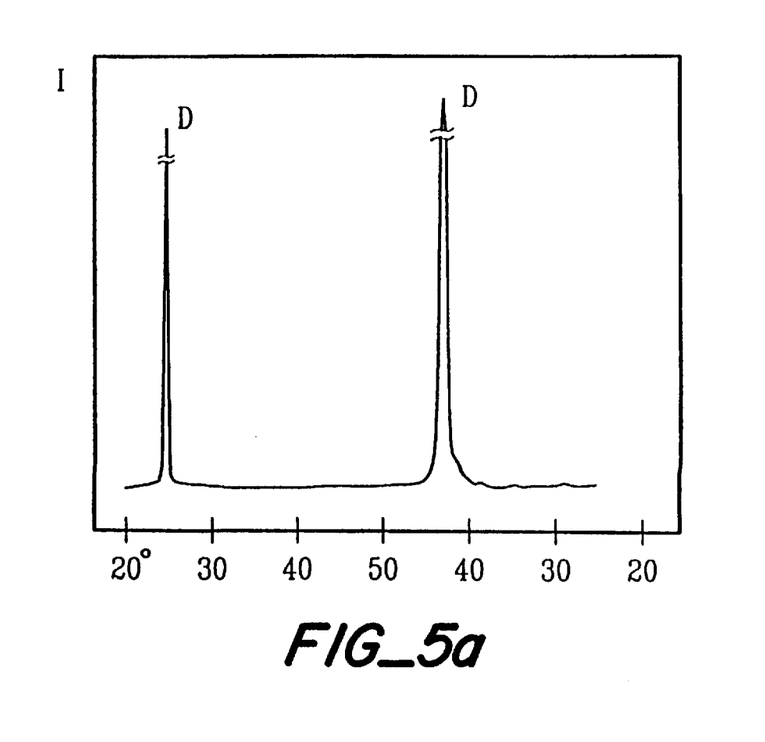
FIGS. 5a to 5c show the results of X-ray diffraction analysis of a work piece, an intermediate body and the final body produced by infiltration of intermediate body by silicon, respectively.
Figure 5B:
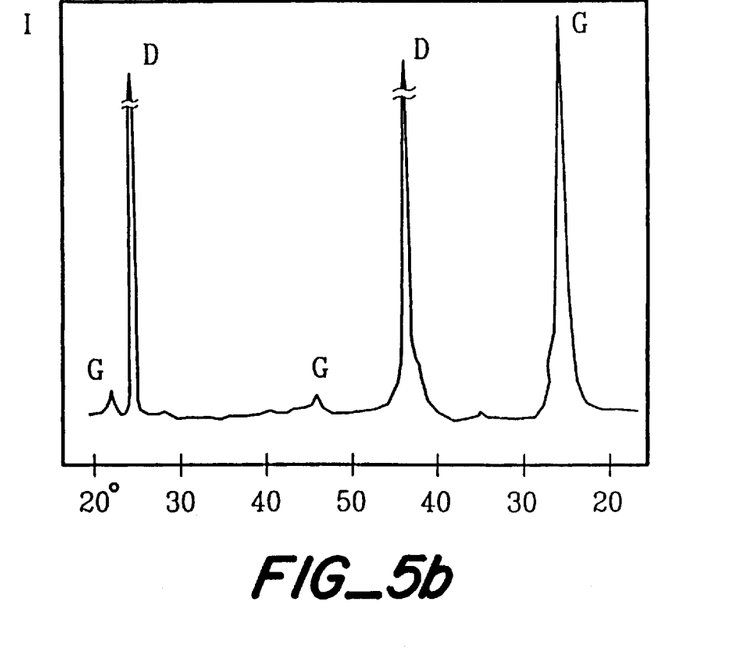
Figure 5C:
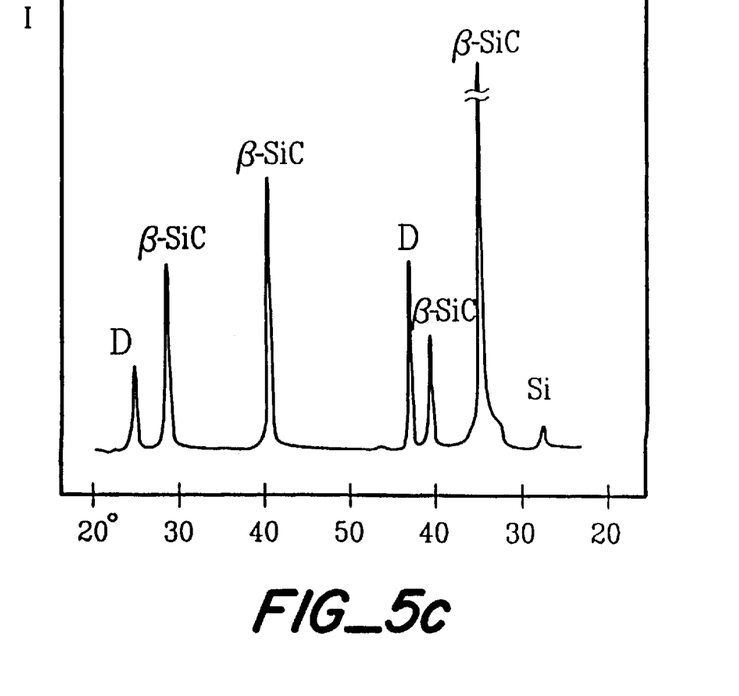

FIGS. 5a–5c show the results of phase X-ray diffraction analysis of samples made according to this process. It is shown from FIG. 5a that the initial work-piece formed of diamond powder contains a diamond phase (marked with "D"). Subsequent heat treatment of the work-piece to obtain an intermediate body results in formation of a graphite phase in it, as can be seen in FIG. 5b (marked with "G"). In the subsequent silicon infiltration of the intermediate body, the silicon reacts with graphite and produces silicon carbide. FIG. 5c shows that the graphite is absent in the final product and that diamond, silicon carbide (marked with "SiC") and silicon (marked with "Si") is present.

USE OF PARAMETER VARIATIONS OF DIFFERENT KIND

Parameter variations may be applied to the material during various processing steps to control both final properties of the product and the manufacturing cost. Different combinations of parameter variations may be applied. The applied parameters are:

diamond particle size
  diamond quality
  diamond bonding
  diamond type
  amount of silicon carbide and silicon
  amount of metal-silicon-carbon or boron-silicon-carbon phases Some of these parameters are dependent on each other. In the following examples of controlling the final properties by the use of parameter variations and combinations thereof will be shown.

Variation of the Diamond Particle Size; Combination of Diamonds of Different Sizes The material according to the present invention may include not only one but several sizes of diamond particles. The use of diamonds of several sizes in the material gives it special characteristics. Large diamond particles provide the material with good abrasive properties (hereby referred to abrasive, wearing, cutting and other mechanical material removing properties). However, in the case of pure silicon infiltrated products lower relative wear resistance of the SiC/Si matrix may lead to debonding, loss of these large diamonds from the matrix, especially under severe operational conditions thereby decreasing the lifetime of a composite tool.

By combining large diamond particles with small in a homogenous mixture, the lifetime of the tools will increase due to an increased wear resistance of the formed new matrix. Small diamond particles reinforce the composite. Being distributed throughout the whole SiC-Si matrix, small diamond particles increase the Young's modulus, the thermal conductivity, the hardness, the wear resistance etc. For instance, when about 40 vol.-% of diamond particles with a size of about 10 μm are included in the SiC-Si matrix, the Young's modulus will increase from 400 to 650 GPa and the thermal conductivity will increase from 80 to 250 W/mK, if compared to a SiC-Si matrix without diamonds. So, the use of small diamonds together with large gives not only enhanced material properties but also is more economical than only to use large diamond particles.

Variations of the Diamond Quality

Diamonds of high quality are generally more expensive than diamonds of lower quality. The term quality is understood as something that varies with the following parameters; mechanical and optical properties, if it is well crystallised or not, defects like inclusions and cracks (mostly in the surface), shape, if they are synthetic or natural etc.

The material according to this invention may be produced by using a combination of cheaper diamonds of lower quality and good quality diamonds in order to vary the composition of the material. Some low quality diamonds are graphitizised faster than diamonds of better quality thereby giving a larger amount of graphite, and thereby a larger amount of silicon carbide produced in the subsequent infiltration step. Additionally graphitization will improve the surface of diamonds of lower surface quality.

Variations of the Diamond Type and the Bonding of Large Diamonds

The method of the present invention allows adjustment of the material to different fields of application by optimising the performance of the composite abrasive grains for each field. Due to its superior hardness, diamond is the component in the composite that is used for the main part of the work effort, therefore this adjustment may be done by altering the diamond parameters; type, particle size and concentration.

There are several types of diamond particles; from well crystallised blocky single crystals with sharp cutting edges to types consisting of different diamond layers on top of each other, e.g. onion-shaped, where each layer has cutting edges. The latter type is sometimes referred to as friable. These two types have significantly different properties and between these extremes there are a large variety of diamond types.

In other materials, for instance when used for grinding wheels, it is known that the chosen diamond type has a great influence on the properties of the grinding wheel. To adjust the properties in a proper way it is however necessary to adjust the bonding force of the diamonds to the diamond type used. In known grinding wheel materials it is difficult to achieve such detailed adjustment of the bond needed for optimal performance. Principally three different types of by bonds are used for grinding wheels; resin bond, metal bond and vitreous bond.

By the method according to the invention there are good possibilities to make an adjustment of bond of larger diamonds (>20 $\mu$m) and properties of the bonding matrix (here consisting of small diamonds, silicon carbide and silicon). A suitable hardness of the matrix can be chosen varying the concentration of small diamonds of size <20 $\mu$m, (20–70 vol.-%); silicon carbide (0.1–75 vol.-%) and silicon (1–40 vol.-%) and thereby also the wear resistance of the matrix and the subsequent bond of the larger diamond particles.

It is possible to choose the hardness of the matrix within a range about 20–63 GPa by varying the composition of the matrix; hardness of diamond is about 100 GPa, of silicon carbide about 25 GPa and of silicon much less than 10 GPa. By this kind of adjustment the performance of our improved material is optimised for various applications.

A matrix hardness of 20–30 GPa is preferable for diamond types requiring a relatively weak bond; 50–63 GPa for diamond types that need a strong bond; and a hardness of 30–50 GPa for diamond types or mixtures requiring intermediate bonding strength.

Variation of the Amounts of Silicon Carbide and/or Silicon

The silicon carbide and silicon matrix is tightly bonded to the diamond particles providing excellent properties of the material according to the present invention. Furthermore the silicon carbide content is important for the properties of the material, affecting for instance the hardness and the bonding of diamonds. The amount of silicon will also affect the properties of the material, for example increased silicon content will lower the hardness and wear resistance. Other properties that are affected by the composition is for instance thermal conductivity increasing with the diamond content, electrical conductivity increasing with the silicon content etc.

The diamond containing composite used for production of grains by crushing comprises about 20–70 vol.-% of diamond particles, 0.1–75 vol.-% of silicon carbide and 1–40 vol.-% of silicon and has a uniform structure due to the unique production method. In practice, composites of this type with a content of silicon less than 1 vol.-% and of silicon carbide less than 0.1 vol.-% are not produced. If the content of silicon carbide is greater than 75 vol.-% the abrasive properties of the grain decrease because of low diamond content. If the content of silicon is greater than 40 vol.-% the grains have low strength.

Therefore a well-balanced composition between the diamond, silicon carbide and silicon is desired. This balance in composition depends on the intended specific application for the material. By varying the composition it is possible to control the properties and thereby adjust them for the specific application. The way to vary the content of silicon and silicon carbide in the final body is to alter the amount of non-diamond carbon in relation to available porosity. This is done by altering the conditions of the heat treatment giving different amount of graphite formed and pyrocarbon added, by different amounts of non-diamond carbon left from binder residues, by diamond size/pore size variations etc.

After crushing a final body with a certain content of diamond particles, silicon carbide and silicon, the individual grains obtained will typically not have the same content of diamond, silicone carbide and silicon as that body. However, the mean value content of the grains, i.e. the content of diamond, silicone carbide and silicon in any appreciable amount of such grains will correspond to the content in this final body.

Variation of the Amounts of Metal-silicon-carbon or Boron-silicon-carbon Phases and Silicon When using silicon alloys for the infiltration of intermediate bodies, as well as when using pure silicon, a silicon carbide matrix is formed, which tightly bonds diamond particles. The alloying element present in the alloy, i.e. metal or boron, provides the formation of new phases along with silicon or instead of it. Thus, such phases can be metal or boron carbides, metal or boron silicides, metal carbosilicides, eutectic alloys of metals or metal silicides with silicon. When the alloying elements reacts with carbon formed during graphitization, carbides are formed. Silicides are formed as a result of interaction of melt components.

The specific alloying element(s) used in the silicon melt determines the formed phases. Some elements form carbides, others suicides. Some elements form eutectic alloys with silicon. By controlling the content of elements in the alloy it is possible to increase or decrease the content of carbides, silicides and eutectic alloys in composition of final material. The hardness of the formed substances is known to increase according to the following: eutectic alloys<silicides<carbides. Thus, by changing the silicon alloy composition, it is possible to affect the matrix hardness of the produced composite material and its wear resistance. The use of silicon alloys comprising metals or boron, results in formation of a greater amount of additional phases. The presence of these additional phases may often give a fine grain structure. This greater number of interfaces is useful for the increase of mechanical properties of the material.

It is well known that the fracture toughness might increase in such a case. By careful control of the amount and the combination of alloying elements, favorable combinations of hardness and toughness can be achieved depending on aimed application.

ADVANTAGES WITH THE PROCESS AND MATERIAL ACCORDING TO THE PRESENT INVENTION

One of the great advantages of the present invention is that the process parameters can be varied to accomplish the desired diamond graphitization in the work-piece to provide optimal conditions for the production of a polycrystalline abrasive grains, having desired strength, physical and mechanical properties.

In comparison with prior art methods where carbon-coated or non-coated diamonds are mixed with carbonaceous materials for production of diamond-silicon carbide-silicon composites, the inventive method using graphitization and possible pyrocarbon deposition, has several advantages:

During diamond graphitization the graphite is formed directly on the surface of all diamond particles and during possible deposition of pyrocarbon directly on graphitizised diamonds. Therefore carbon is tightly in contact with the surface. Thus, the critical small pores between particles remain free for subsequent silicon/silicon alloy infiltration of the intermediate body. Smaller particles of carbon black or carbon fibres etc. are placed between the diamonds when using known prior art techniques of mixing carbonaceous materials with diamond particles. These smaller particles may agglomerate in the narrowed pores, thus making the pore sizes even smaller, which may affect the infiltration negatively.

The distribution of carbon is important for the properties of the final material. The carbon layer is in tight contact with the diamond surface by the diamond transformation into graphite and by optional deposition of pyrocarbon onto the body. This tight contact guarantees the formation of silicon carbide and any other carbides of alloying elements, directly on the surface of the diamond particles thus forming a diamond-matrix interface of high adhesion i.e. the diamonds are tightly bonded to the matrix. The properties are improved due to the high adhesion of both small and large diamonds. The diamonds will not chip out from the matrix so easily while used in different applications. The material is extremely wear resistant. When using in operations requiring very strong bonding, the large diamond particles will be used totally in the process and if the right type of diamond is used, while in traditional abrasive materials (with metallic or organic bonds) the diamonds are only used to about 50 vol.-% before falling out from the matrix.

Heat treatment of the eventual binder and graphitization can be accomplished using the same equipment as for silicon/silicon alloy infiltration (when pyrocarbon deposition is not used). Thus these process steps can be realised step by step in the same furnace resulting in decreased overall time for producing the final material.

The graphitization of diamond starts on the surface of the diamond particles, gradually propagating deeper into the particle. The graphitization transforms the defective layer on the diamond surface, resulting in improvement of the particle properties and as a consequence, of the whole composite material for instance regarding the thermal stability. This allows the use of relatively low cost diamonds.

In the present invention, graphitization of diamond with or without deposited pyrocarbon avoids the various problems associated with physically mixing in carbonaceous materials as the source of carbon. These problems include non-uniform distribution of carbon, incomplete reaction with silicon, blocking of pores and inhomogeneities due to different size, shape and density of the mixed materials.

The graphitization will provide for fast and proper carbon formation in the whole body volume, starting from the surface of the diamond, expanding linearly. Only a relatively small amount of diamond is transformed. Thus when producing very thick and large bodies, the graphitization is advantageous due to the ability to form carbon even in deeper parts of the body without risk of blocking the pores for the subsequent infiltration.

By using earlier known methods the forming of green bodies of a carbon-coated or non-coated diamonds mixed with carbonaceous materials, is done in a temporary mould or same mould as the evaporation/decomposition of binders and silicon infiltration. A relatively large quantity of binders might be required for this forming, especially when using large diamond particles. The productive efficiency is decreased by requiring a mould for each green body when placed in a furnace. The consumption of moulds is high and the lifetime of the mould is decreased due to the high wear in the heat treatment processes. There might also be problems with the releasing of the composites from the moulds. Graphite moulds are commonly used and during the liquid silicon infiltration step some silicon may react with the graphite and thereby cause problems of releasing of the body from the mould. The process according to the present invention avoids the expensive use of mould during the heat treatment and silicon infiltration steps leading to cost advantages by not being restricted to the use of moulds.

The process according to the present invention gives significant cost advantages due to the fact that a great number of large bodies may be produced in one batch and the main method to produce carbon, graphitization of diamond, is a faster method than pyrocarbon and uses no gas, and low pressures are used. When no pyrocarbon is added the process is a one step process where the graphitization of diamond is performed during the temperature raise before the silicon/silicon alloy infiltration. There is no need of using moulds than for, in some cases, forming. Diamonds with a relatively lower price may be used.

The method makes possible to produce diamond containing grains of large sizes having a wider technological use, which otherwise is expensive and scarce.

By using the present method for production of these grains it is possible to find a new qualified application for the very fine diamond types, which are relatively cheap and that are for the moment of pretty small economical use.

The Abrasive Grains According to the Present Invention Holds Several Advantages:

The versatility of the process is unique. The process parameters can be varied to give the produced material desired properties. With this method it is possible to produce materials of good wear resistance and with improved performance for abrasive, grinding and other mechanical removing operations.

One feature of the invention is that the proposed material is characterised by allowing the combination of different excellent properties simultaneously and matching such properties that correspond best to the various intended applications. Controllable properties are:
1) A high Young's modulus and sufficient strength in combination with low density.
2) High hardness and high bonding strength of the diamonds results in excellent abrasion and erosion wear resistance.

3) Adjustment of the hardness and the bonding strength of the matrix according to the type of the larger diamonds.
4) A high thermal conductivity, low thermal expansion coefficient, depending on the diamond content.
5) Maintenance of mechanical properties after exposure to temperatures up to 1500°–1600° C. in vacuum.

When mixing together small and large diamond particles, two facts affect the material properties; the high adhesion between the diamond particles and the matrix, and the high wear resistance of the matrix due to small diamonds distributed therein. Large diamond particles will drop out from the material if the bond to the matrix is insufficient or the matrix has low wear resistance. Small diamond particles reinforce the matrix, giving it high wear resistance and increased rigidity, strength, and thermal conductivity. All this improves significantly the abrasive properties (wearing, cutting and other mechanical material removing properties) of the materials: increased thermal conductivity decreases the temperature in the working area of diamond composite abrasive grains.

Experimental

EXAMPLES OF METHOD REALISATION AND GRAIN PROPERTIES

The following different diamond types were used for preparation of samples, which were used for production of grains that were tested: ACM 5/3 synthetic diamond particles (size range 3–5 µm), ACM 10/7 synthetic diamond particles (size range 7–10 µm), ACM 14/10 synthetic diamond particles (size range 10–14 µm), ACM 28/20 synthetic diamond particles (size range 20–28 µm), ACM 40 synthetic diamond particles (with size smaller than 40 µm) and ACM 63/50 synthetic diamond particles (size range 50–63µm), all from Superhard Materials Institute, Kiev, Ukraine.

Example 1

Cylindrical samples (Ø=20 mm, h=3 mm) was produced from diamond powder of ACM10/7 type. A mixture is made from the diamonds and a binder—25% alcohol solution of phenol formaldehyde resin. The amount of dry resin is 2 wt.-% from the mass of diamond powder. The mixture is stirred thoroughly and passed through a screen with a mesh size of 200 µm.

The forming of the samples is made by pressing using metallic moulds, at room temperature, pressing with a force of 45 kN. The green bodies are taken out of the mould and kept at room temperature in air for 10 hours with subsequent drying at 700° C. for 1 hour and hardening at 150° C. for 1 hour.

The produced work-pieces contain 98 wt.-% of diamond and have a porosity of 51 vol.-%.

Heat treatment of the work-pieces is done in vacuum (pressure 0.1 mmHg) at 1550° C. for 3 min. This decreases the diamond content in the intermediate bodies by 15 wt.-%.

Infiltration of the intermediate bodies is made by melting silicon on the surfaces of the intermediate bodies at 1550° C.

The produced polycrystalline bodies comprise 41 vol.-% diamond, 44 vol.-% silicon carbide and 15 vol.-% silicon and have a Young's modulus of 570 GPa.

The first coarse crushing of the samples was made by a hydraulic press with a force of 1.5 MN. The coarse crushing was followed by a selective crushing with a splined crusher. After the first crushing abrasive grains larger than 2500 µm was screened. After the second crushing grains larger than 2000 µm was screened. The crushing was followed by the step of screening classification, which is carried out using standard screen set.

Some of the grains were ovalised, round off, by a vortical ovaliser. A mixture of ferromagnetic particles and the crushed grains are rotated by a magnetic field with a rotation frequency 3000 rpm. A final screening is then made.

The static and dynamic strength of the ovalised and non-ovalised grains was measured (see Table 1) and the temperature stability of the grains was measured, i.e. the strength after treatment in argon medium for 20 min at temperature 1200° C. (see Tables 2–3).

Abrasive grains with size 125/100 µm was used to produce abrasive pastes by the following:

The following components—21 g stearine, 0.4 g wax, 32.6 g vaseline and 5 g olein acid—were placed in a special vessel. The components were heated to 60–76° C. by heating the vessel in a water bath until the mixture was totally molten and stirred. 40g of the abrasive grains was wetted in 10 g olein acid and stirred while heating up to 40–50° C. Finally these two mixtures are mixed together and stirred.

The produced paste was tested by its abrasive ability. (See table 1)

Example 2

Cylindrical samples were produced from diamond powder of ACM-40 type (a homogeneous mixture of diamond with sizes of 1 to 40 µm) as in example 1. The produced samples comprise 43 vol.-% diamond, 39 vol.-% silicon carbide and 18 vol.-% silicon and the Young's modulus of the material is 560 GPa.

Ovalised and non-ovalised abrasive grains were produced according to the same methods as in example 1, as well as the abrasive paste. The abrasive grains and the paste were tested as in example 1. The test results are shown in Tables 1–3.

TABLE 1

| Sample | Initial diamond type | Abrasive grain size [µm] | Static Strength of grains (N) | Dynamic Strength of grain | Abrasive Ability of the paste, (mg) |
|---|---|---|---|---|---|
| 1 | ACM 10/7 | 1000/800 (O) | — | 1–5 | — |
| 2 | | 1000/800 | — | 98 | — |
| 3 | | 500/400 (O) | 111,85 | 58 | — |
| 4 | | 500/400 | 102,37 | 42 | — |
| 5 | | 250/200 (O) | 19,0 | — | — |
| 6 | | 250/200 | 16,9 | — | — |
| 7 | | 160/125 (O) | — | 67 | — |
| 8 | | 160/125 | — | 60 | — |
| 9 | | 125/100 (O) | 8,24 | — | — |
| 10 | | 125/100 | 6,03 | — | — |
| 11 | ACM <40 | 500/400 (O) | 114,35 | 62 | — |
| 12 | | 500/400 | 105,81 | 44 | — |
| 13 | | 250/200 (O) | 15,2 | — | — |
| 14 | | 250/200 | 10,5 | — | — |
| 15 | | 150/125 (O) | — | 55 | — |
| 16 | | 160/125 | — | 49 | — |
| 17 | | 125/100 (O) | 6,1 | — | — |
| 18 | | 125/100 | 5,5 | — | 203 |

Note:
(O) stands for ovalised powder

Table 1 shows that the produced grains give high values of both static and dynamic strength. The grains are characterised by high resistance to dynamic influences. The dynamic strength increases with increasing abrasive grain size.

The static strength of ovalised grains of 500/400 class corresponds to high quality synthetic diamonds of AC65 type and the dynamic strength is greater than that for the best synthetic diamonds of FSU, diamonds of AC160 type according GOST requirement no 9206-80. (GOST requirement: The static strength of AC65 is 103 N. The dynamic strength of AC160 is 50.)

The abrasive ability of the paste comprising abrasive grains (measured as mass of grinded cemented carbide by 0.1 g of diamond contained past) complies the requirements placed by the GOST requirement no 255993-83 (the GOST requirement is 160 mg) to synthetic diamonds despite that the diamond content in the grains is less than 50 vol.-%

TABLE 2

The temperature stability of the grains at static strength

| Sample | Abrasive grain size ($\mu$m) | Static strength (N) Before heat treatment | Static strength (N) After heat treatment | Thermal stability factor, Kt |
|---|---|---|---|---|
| 1 | 2000/1600 | 398,57 | 374,68 | 1,060 |
| 2 | 1600/1250 | 289,75 | 262,65 | 1,100 |
| 3 | 1250/1000 | 244,36 | 241,51 | 1,040 |
| 4 | 1000/800 | 228,83 | 227,19 | 1,007 |
| 5 | 800/630 | 145,11 | 146,97 | 0,987 |
| 6 | 630/500 | 118,34 | 119,46 | 0,990 |

TABLE 3

The temperature stability of the grains at dynamic strength

| Sample | Abrasive grain size ($\mu$m) | Dynamic Strength Before heat treatment | Dynamic Strength After heat treatment |
|---|---|---|---|
| 1 | 1250/1000 | 52 | 51 |
| 2 | 1000/800 | 43 | 42 |
| 3 | 800/630 | 35 | 35 |
| 4 | 630/500 | 51 | 49 |
| 5 | 500/400 | 53 | 55 |

Table 2 and 3, shows the static and dynamic strength of the grains after heat treatment, 20 minutes at 1200° C. in inert medium, practically do not change. The thermal stability corresponds to that of natural diamond. Strength of synthetic diamond under same test conditions decreases with a factor ranging from 2.5 till 5.0 and greater, see "Physical properties of diamond: Handbook", Kiev 1987, p 67.

Example 3

Two bowl face grinding wheels of the type 12A2-45[i] (dimensions 125×10×3×32) with conventional concentration of abrasive 100%, i.e. abrasive grains occupy 25 vol.-% in the wheel were produced on the base of grains prepared in example 2. For the production of the wheels grains of size range 160/125 $\mu$m and an organic bond B2-01 (Superhard Materials Institute, Kiev, Ukraine) were used.

The wheels were tested for grinding of sintered alloy T15K6 (79% WC, 15% TiC, 6% Co) (cemented carbide) and steel P18 (0.7–0.8% C, 17–18.5% W, 0.5–1.0% Mo, 3.8–4, 4% Cr, 1–1.4% V). The test results are shown in Table 4.

The testing conditions: V=20 m/sec (rotation velocity), Slengthwise=2,0 mm/min (lengthwise supply), $\delta_{cross}$=0,02 mm (cross supply for double run).

TABLE 4

| Parameters | Sintered alloy T15K6 | Steel P18 |
|---|---|---|
| Relative consumption of wheel | 1,2–1,6 mg/g | 0,7 mg/g |
| Surface roughness after machining | 1,25 $\mu$m | 0,8–1 $\mu$m |
| Power of grinding | 1.5–2,0 kW | 1,7–2,0 kW |

Conclusions from the Examples

The produced grains of the diamond-silicon carbide-silicon material have excellent values of both static and dynamic strength, which make them comparable with high-quality synthetic diamonds.

The produced grains keep their strength after heat treatment at 1200° C. These properties measure up to those of natural diamonds and are 2–5 times greater compared to synthetic diamonds.

The produced diamond grains have high abrasive ability that is on a par with that of synthetic diamond particles. Note that a content of diamond particles in the produced grains is about 50 vol.-%, i.e. to achieve the same abrasive ability less diamond is needed, hence economy of diamond.

The grains can be used for production of different types of diamond tools, such as diamond wheels, diamond pastes, etc. In this case production methods and equipment are the same as those used for production of goods from synthetic diamonds.

Test results have shown that diamond tools made of the grains can be applied not only for machining of sintered alloys and other similar materials, but also of iron based alloys. Thereby, using the produced grains it is possible to manufacture a combined tool, which has a wider field of application.

As taught by the foregoing description and examples, a greatly advanced method of producing abrasive grains and the composite abrasive grains produced thereby is provided by the present invention. The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

METHOD SPECIFICATIONS

The properties of the claimed material have been determined by the following methods.

1. The static compression strength of grinding grains is determined by continuously measuring the breaking load resulting in breaking of a certain amount of grains:

The grains are placed between two parallel corundum plates and subjected to single-axial compression with a smooth increase of the force. Static strength of the grinding grains was determined by sequential crushing of 50 grains. The breaking loads were calculated as follows:

$$P = \frac{\sum_{1}^{50} P - \sum_{1}^{n} P}{50-n}, \text{ where}$$

n—quantity of grains, which were broken under load greater than $2P_{med}$ $P_{med}$—medium strength of 50 grains.

2. Thermal resistance of grinding grains, (thermal resistance factor $K_t$), is determined by the following ratio:

$K_t = P_1/P_2$, where $P_1$—static compression strength of powders before heat treatment $P_2$—static compression strength of powders after heat treatment The heat treatment is carried out at 1200° C. in a medium of inert gas (Argon) for 20 minutes.

3. Dynamic strength is determined using device of Fritester type. The powder sample (grains) is placed in a cylindrical steel vessel with a steel ball that is freely moving along the vessel axis. The vessel is fixed in a machine, which provides it with a vibrating reciprocating motion along its axis. The quantity of load cycles is registered. The powder strength (index by Fritester) is determined by quantity of load cycles, which are necessary for breaking of 50 weight-% of the grains of initial probe. Dynamic strength is calculated as an arithmetic mean after test of three samples of 2±0.2 carat.

What is claimed is:

1. A low pressure method for producing abrasive grains comprising the steps of forming a work piece from diamond particles, heating the work piece and controlling the heating temperature and heating time so that graphite is created by graphitization of diamond particles during the heat treatment of the work piece in an amount of 1–50 wt-% of the amount of diamond, thereby creating an intermediate body, infiltrating silicon or silicon alloy into the intermediate body, thereby creating a polycrystalline body, and thereafter crushing the polycrystalline body into grains.

2. The method according to claim 1, wherein silicon alloy is infiltrated into the intermediate body, the alloy comprising at least one metal selected from the group consisting of Ti, Zr, Hf, V, Nb, Ta, Cr, Mo, W, Mn, Re, Co, Ni, Cu, Ag and Al, and the elements B and Ge.

3. The method according to claim 2, wherein the silicon alloy contains Ti, Zr, or Hf in an amount of less than 50 wt-%.

4. The method according to claim 2, wherein the silicon alloy contains V, Nb, or Ta in an amount of less than 20 wt-%.

5. The method according to claim 2, wherein the silicon alloy contains Cr and Re in an amount of less than 45 wt-%.

6. The method according to claim 2, wherein the silicon alloy contains Mo and W in an amount of less than 10 wt-%.

7. The method according to claim 1, wherein the polycrystalline body is crushed into grains having a size of at least 40 µm.

8. The method according to claim 1, wherein the work piece is formed of diamond particles having a size of 3–500 µm.

9. The method according to claim 1, wherein the graphite created by graphitization is 6–30 wt-% of the amount of diamond.

10. The method according to claim 8, wherein the heating temperature during graphitization is lower than 1700° C.

11. The method according to claim 1 wherein the heating temperature and heating time needed for graphitization is empirically determined for the heating equipment used.

12. The method according to claim 10, wherein the work piece has a porosity of 25–60 vol.-%.

13. The method according to claim 9, wherein carbon is deposited in the work piece by exposing the work piece to a gaseous hydrocarbon or hydrocarbons at a temperature exceeding the decomposition temperature for the hydrocarbon or hydrocarbons.

14. The method according to claim 13, wherein graphitization of the diamond particles in the work piece is done before the work piece is exposed to a gaseous hydrocarbon or hydrocarbons at a temperature exceeding the decomposition temperature for the hydrocarbon or hydrocarbons.

15. The method according to claim 9, wherein the work piece is formed from a homogeneous mixture of diamond particles of different sizes.

16. The method according to claim 9, wherein the work piece is formed in a mould and taken out of the mould before the steps of graphitization and infiltration of silicon or silicon alloy takes place.

17. The method according to claim 13, wherein the polycrystalline body is crushed into grains having a size of at least 40 µm.

18. The method according to claim 1, wherein the work piece has a porosity of 25–60 vol.-%.

19. The method according to claim 1, wherein carbon is deposited in the work piece by exposing the work piece to a gaseous hydrocarbon or hydrocarbons at a temperature exceeding the decomposition temperature for the hydrocarbon or hydrocarbons.

20. The method according to claim 1, wherein the work piece is formed from a homogeneous mixture of diamond particles of different sizes.

21. The method according to claim 1, wherein the work piece is formed in a mould and taken out of the mould before the steps of graphitization and infiltration of silicon or silicon alloy takes place.

22. The method according to claim 1, wherein the heating temperature during graphitization is lower than 1700° C.

* * * * *